Aug. 4, 1936.  J. H. WHITEMAN ET AL  2,049,679
HAY FORK
Filed Nov. 26, 1935
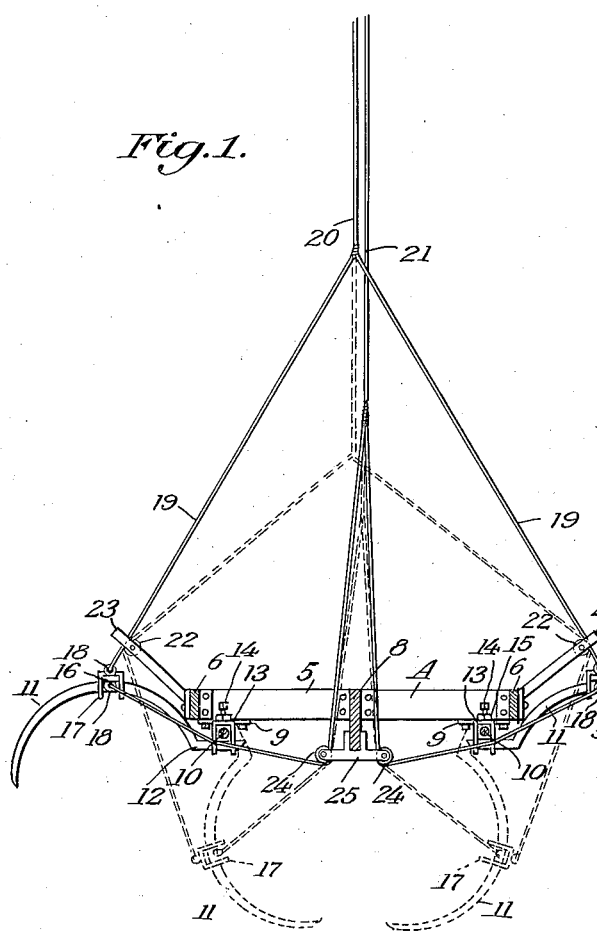
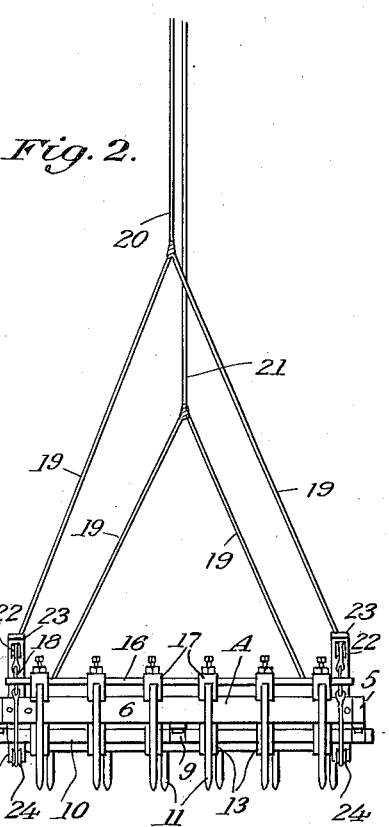
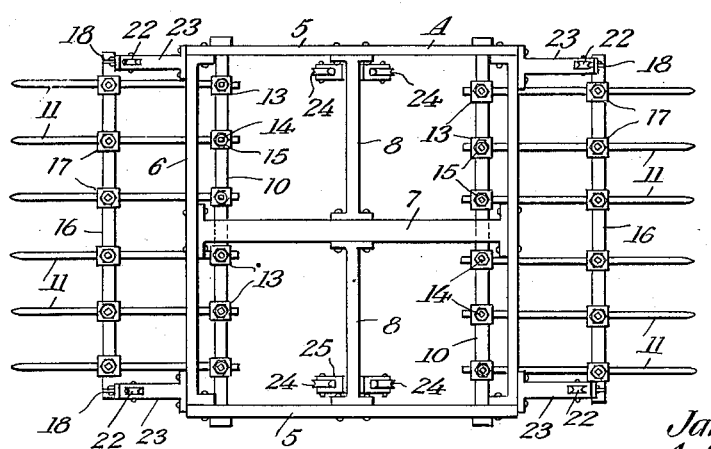
James H. Whiteman
Arthur T. Whiteman
INVENTORS
BY Victor J. Evans & Co.
ATTORNEYS Patented Aug. 4, 1936

2,049,679

UNITED STATES PATENT OFFICE 2,049,679

HAY FORK

James H. Whiteman and Arthur T. Whiteman, La Grande, Oreg.

Application November 26, 1935, Serial No. 51,688

3 Claims. (Cl. 294—107)

The invention relates to a power fork and more particularly to a hay fork.

The primary object of the invention is the provision of a fork of this character, wherein the same is operated by power from a suitable source and is utilized for the purpose of handling manure, hay and other similar more or less loose materials, the tines of the fork being of a construction to assure a digging in action on the materials to be lifted, particularly when handling a large bulk or quantity thereof and in this manner enabling a positive lift of the load without the same becoming free from the fork during the lifting operation.

Another object of the invention is the provision of a fork of this character, wherein the construction thereof is novel in form in that the tines are readily detachable so that their number can be increased or decreased accordingly to the requirements of service of the fork.

A further object of the invention is the provision of a fork of this character, wherein the tines which are of a particular shape have swinging movement and are pivotally supported upon a frame functioning as a carrier body for such fork and this body is of a weight to assure the firm gripping of a load, such as hay or the like, so that the same can be successfully lifted in the operation of the fork.

A still further object of the invention is the provision of a fork of this character, which is simple in construction, thoroughly reliable and effective in its operation, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical transverse sectional view through a fork constructed in accordance with the invention showing by full lines the tines in open position and by dotted lines the tines in closed position for the lifting of a load.

Figure 2 is an elevation of the fork.

Figure 3 is a top plan view.

Similar reference characters indicate corresponding parts throughout the several views in the drawing.

Referring to the drawing in detail, the fork comprises a main frame A including the side bars 5, end cross bars 6 and intermediate braces 7 and 8, respectively, these being united in any suitable manner to give rigidity and weight to the frame A. Arranged at the under side of the frame A close to the end bars 6 are bearings 9 for turning axles 10, these being journaled in said bearings 9 parallel with the bars 6 of the frame A. Straddling the axles 10 are inverted substantially U-shaped clips 13, these having suitable opposed slots for receiving the inner ends 12 of curved tines or fingers 11 so that the said ends 12 will underlie the axles 10 crosswise thereof. Tapped in the top of each clip 13 is a screw 14 which is worked against the axle 10, thereby clamping the end 12 against the under side of said axle and also binding the clip 13 upon this axle. In this manner the clips 13 will firmly clamp the ends 12 of the tines or fingers 11 and become fast on the axles 10 as does appear in Figure 1 of the drawing and each screw 14 carries a jamb nut 15 for locking it in adjusted position. By this arrangement and in the use of the clip 13 the tines or fingers 11 can be interchangeable so that any number of said tines or fingers 11 can be fastened with the axle 10 as occasion may require.

Overlying the tines or fingers 11 are the spacer bars 16, these being straddled by clips 17 which are similar to the clips 13 and accommodate the tines or fingers 11 therein so that in this manner the latter can be fastened in their spaced relation to each other as should be clearly apparent from Figures 2 and 3 of the drawing.

Mounted in the spacer bar 16 at opposite ends thereof are eyes 18 which are exposed above and below the said bar and attached to the same are the branches 19 of independent cables 20 and 21, respectively, the branches of the cable 20 being trained over guide pulleys 22 fitted in angle brackets 23 secured to the end bar 6 of the frame A. The branches of the cable 21 are trained over guide pulleys 24 in hangers 25 fixed to the brace bar 8 next to opposite sides 5 of the frame A. It will be seen that when a pull is had upon the cable 21 the said tines or fingers 11 will close and by reason of the curvature of these tines or fingers the same when moving to closing position will effect a positive and firm bite upon the load to be lifted and such biting action being intensified when the load is heavy. Also the weight of the frame A has a tendency to drive the tines into a load when the same are shifted to closing position with relation to each other.

The cables 20 and 21 are operated from any suitable source of power and a continued pull on the cable 21 which closes the tines or fingers 11 will lift the load as carried by the fork.

It is assumed that the manner of operation of the fork will be obvious from the showing in Figures 1 to 3 of the drawing and, therefore, a more extended explanation of the working of the fork has been omitted for the sake of brevity.

What is claimed is:

1. A fork of the kind described comprising a frame, turning axles journaled in the frame in spaced parallel relation to each other, a plurality of tines, clips embracing the axles and tines for separably and adjustably connecting the said tines with the axles, spacer bars clipped with said tines to maintain the same in properly spaced relation with respect to each other, and pull cables connected with the spacer bars and guided for the opening and closing of the tines with relation to each other.

2. A fork of the kind described comprising a frame, turning axles journaled in the frame in spaced parallel relation to each other, a plurality of tines, clips embracing the axles and tines for separably and adjustably connecting the said tines with the axles, spacer bars clipped with said tines to maintain the same in properly spaced relation with respect to each other, pull cables connected with the spacer bars and guided for the opening and closing of the tines with relation to each other, and guide brackets and hangers for the respective cables and carried by the frame.

3. A fork of the kind described comprising a frame, turning axles journaled in the frame in spaced parallel relation to each other, a plurality of tines, clips embracing the axles and tines for separably and adjustably connecting the said tines with the axles, spacer bars clipped with said tines to maintain the same in properly spaced relation with respect to each other, pull cables connected with the spacer bars and guided for the opening and closing of the tines with relation to each other, and guide brackets and hangers for the respective cables and carried by the frame, the said tines being inwardly curved and having attaching ends for the clips.

JAMES H. WHITEMAN.
ARTHUR T. WHITEMAN.